United States Patent [19]
Sebald et al.

[11] Patent Number: 4,745,623
[45] Date of Patent: May 17, 1988

[54] ADAPTIVE TRANSVERSE EQUALIZER

[75] Inventors: Georg Sebald, Munich; Berthold Lankl, Landsberg; Josef A. Nossek, Iffeldorf, all of Fed. Rep. of Germany

[73] Assignee: Siemens Aktiengesellschaft, Berlin and Munich, Fed. Rep. of Germany

[21] Appl. No.: 911,675

[22] Filed: Sep. 25, 1986

[30] Foreign Application Priority Data

Oct. 3, 1985 [DE] Fed. Rep. of Germany ....... 3535390

[51] Int. Cl.$^4$ ..................... H03H 7/30; H03K 5/159
[52] U.S. Cl. ....................................... 375/14; 333/18; 364/724
[58] Field of Search ............... 375/12, 13, 14; 333/18, 333/28 R, 165, 166; 364/724

[56] References Cited

U.S. PATENT DOCUMENTS

| | | | |
|---|---|---|---|
| 4,404,600 | 9/1983 | Murakami | 333/18 |
| 4,468,786 | 8/1984 | Davis | 375/11 |
| 4,476,491 | 10/1984 | Murata et al. | 375/14 |
| 4,524,424 | 6/1985 | White | 364/724 |
| 4,535,443 | 8/1985 | Korevaar | 333/18 |
| 4,550,415 | 10/1985 | Debus, Jr. et al. | 375/14 |
| 4,575,857 | 3/1986 | Murakami | 375/14 |

FOREIGN PATENT DOCUMENTS 2133037 10/1975 Fed. Rep. of Germany.

OTHER PUBLICATIONS

Journal of Research & Development, 9, (1965.07), 4, "A New Approach to Time-Doman Equalization", by E. Gorog, pp. 228-232.

Zie Voor Titel Boek, de 2e Pagina, Jun. 1971, "Construction and Evaluation of a Decision Feedback Equalizer", by R. J. Keeler, pp. 20-8-21-13.

Cselt Rapporti Tecnici, vol. 3, No. 4, Dec. 1975, "Generalized Decision Feedback Receiver for PSK and APSK Signals", by R. Dogliotti et al, pp. 53-61.

IEEE/Elsevier Science Publishers B.V. (North Holland), 1984, "Adaptive Equalization Structures in High Capacity Digital Radio: Predicted and Observed Outage Performance", by Luigi Moreno et al, pp. 993-997.

Primary Examiner—Robert L. Griffin
Assistant Examiner—Stephen Chin
Attorney, Agent, or Firm—Hill, Van Santen, Steadman & Simpson

[57] ABSTRACT

An adaptive transverse equalizer formed of delay elements, control elements and summers, and which is constructed in accordance with a serial-in/parallel-out or parallel-in/serial-out concept. Such an equalizer should be improved such that, given a simple structure, it exhibits a high equalizing performance and is particularly suitable for multi-stage digital radio link systems. For this purpose, an equalizer is provided as a linear transverse equalizer and having $(n-1)$ positive and m negative coefficients set in accordance with a zero-forcing algorithm. A linear transverse filter is provided which supplies at least one additional, positive coefficient following upon an access region of the linear transverse filter and whose loop transit time corresponds to n-times or $(n+i)$ times a symbol period.

7 Claims, 3 Drawing Sheets

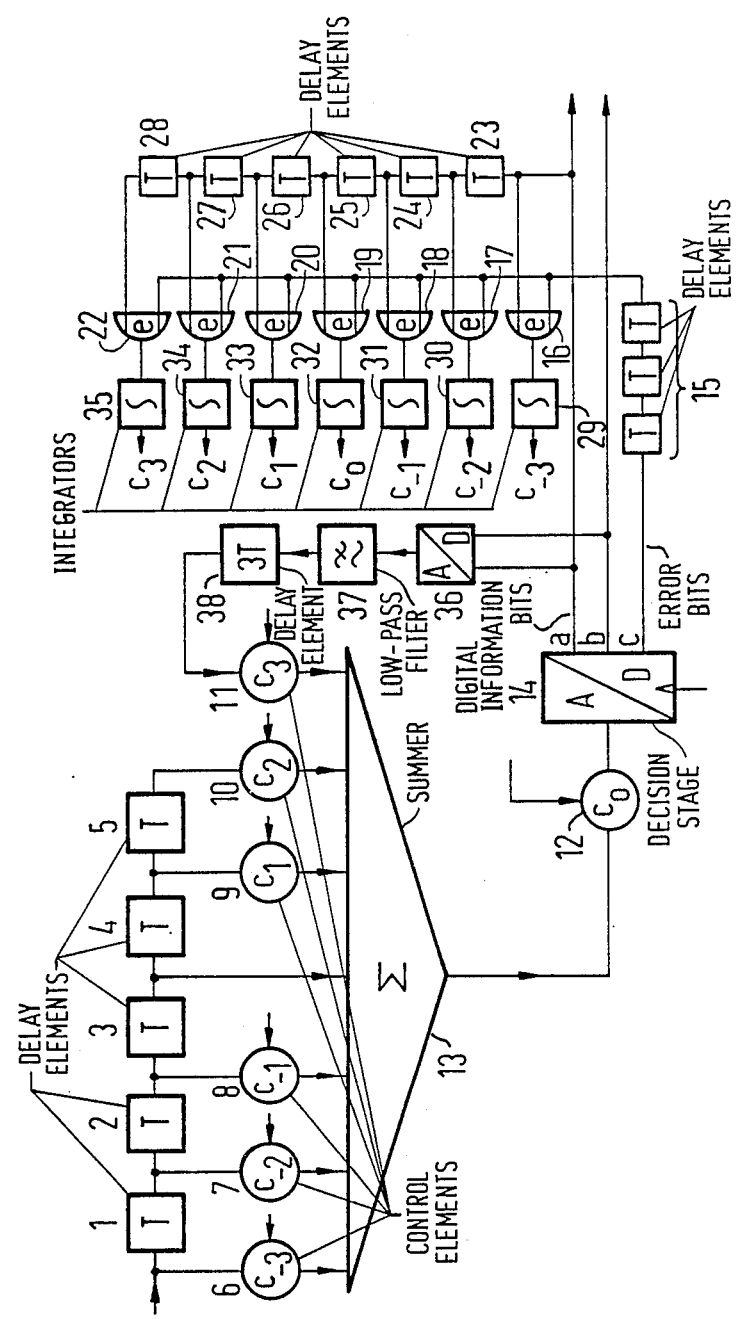

ADAPTIVE TRANSVERSE EQUALIZER

BACKGROUND OF THE INVENTION

The invention relates to an adaptive transverse equalizer formed of a plurality of time delay elements iteratively connected. Each has a delay time T in accordance with the spacing of two characters sent in succession, and has control elements (coefficients) which are connected to the inputs of a summer. The manipulated variables are derived from the output signal of a decision stage. In an equivalent arrangement, the input signal is applied in parallel to the control elements. The output signals of the control elements are supplied into a delay time chain with a spacing T. Such an equalizer is known, for example, from DT No. 21 33 037 B2.

In digital radio link systems comprising multi-stage quadrature amplitude modulation (for example 16 QAM, 64 QAM, . . .) and a high data rate (140 Mbit/s), adaptive equalizers are employed in the time domain as an effective means against the linear distortions produced by multi-path propagation. Although linear transverse equalizers provided for this purpose have a good acquisition behavior and good convergence properties, these advantages must be weighed off against the unavoidable disadvantages, namely noise boosting due to linear balancing or moderate performance rise, given equalizer extension. Equalizers having quantized feedback (referred to as decision feedback equalizers) exhibit a considerable balancing capability given a low number of coefficients, at least in the case of minimum-phase distortions. Their disadvantage, however, lies in the bearer propagation inherent in recursive systems and in the poorer acquisition properties.

SUMMARY OF THE INVENTION

An object of the invention is to create an adaptive equalizer having a simple structure which is particularly suitable for digital radio link systems.

This object is achieved in accordance with the invention with an equalizer fashioned as a linear transverse equalizer and having $(n-1)$ positive and m negative coefficients. They are set in accordance with a zero-forcing algorithm and by at least one additional, positive decision-fedback coefficient following an access region of a linear transverse filter whose loop transit time corresponds to n times or $(n+i)$ times a symbol period, wherein n is a whole number $\geq 2$, i is a whole number $\geq 1$, and m is a whole number $\geq 0$.

In an advantageous development of the invention, given design thereof as a complex transverse equalizer having identically designed equalizers in the I-channel and Q-channel, feedback paths are conducted from the decision stage output from every channel to the corresponding control element of the same channel and of the other channel.

BRIEF DESCRIPTION OF THE DRAWINGS

FIG. 2 is a one-channel adaptive transverse equalizer having a serial input and a parallel output.

DESCRIPTION OF THE PREFERRED EMBODIMENTS

The equalizing process shall be set forth with reference to the pulse diagrams of FIG. 1. The base band pulse response of a QAM system given two-way propagation and given employment of a linear transverse equalizer having a zero-forcing algorithm shall therefore be considered.

Figure 1A:
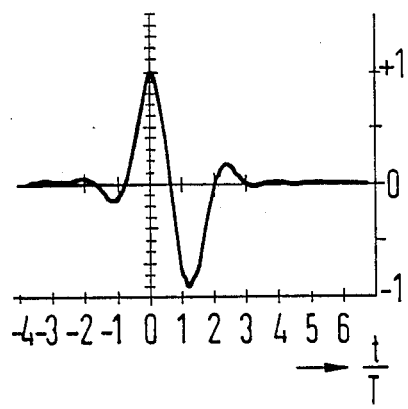
FIGS. 1a through 1d show pulse diagrams for explaining a balancing process according to the invention.
Figure 1C:
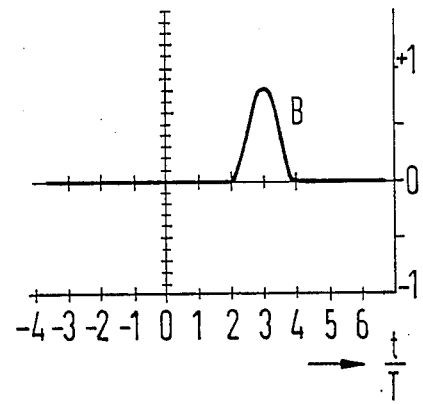
Figure 1B:
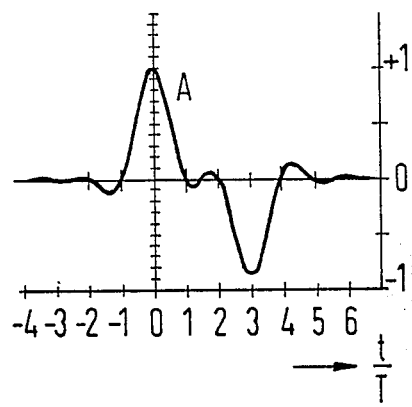
Figure 1D:
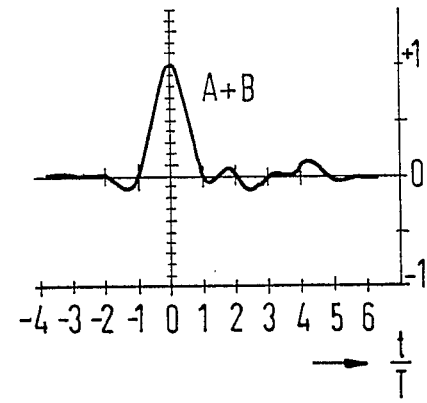

FIG. 1a shows the curve of the pulse response, of a Nyquist system having $\rho=0.5$ and a 35 Mbaud modulation rate which is distorted by a powerful echo, delayed by 6.3 ns. This pulse is first equalized by a linear transverse equalizer having five (complex) coefficients, and is equalized with the assistance of the zero-forcing algorithm. FIG. 1b shows the equalized pulse A in which the anticipated nulls can be clearly seen in the access region of the equalizer. It is important that the remaining intersymbol interference ISI occurs essentially in concentrated fashion on a clock time point (following the access region given minimum-phase and proceeding the access region given a non-minimum-phase channel). This can be easily seen in FIG. 1b where the residual ISI mainly appears at +3 on the time axis. Given an equalizing extension, this residual ISI is postponed in the clock grid and thus becomes only insignificantly smaller. In accordance with the invention, the residual ISI essentially concentrated at a clock time point is eliminated by a decision-controlled recursive path; thus, the equalizing capability is considerably boosted. For this purpose, a decision-fedback coefficient is added to the linear transverse filter having five cofficients. The correction pulse B at the location +3 on the time axis nearly completely eliminates a residual ISI (see, for example, FIGS. 1c, 1d).

FIG. 2 shows the circuit diagram of a real, one-channel, linear adaptive transverse equalizer (serial in/parallel out) for a 4-stage base signal which is adapted in accordance with the zero-forcing algorithm.

As a consequence of the high data rate and of the specific nature of the radio link channel, few but strong echoes having a relatively short differential transit time, that is equalizers having a correlation means in accordance with what is referred to as the zero-forcing algorithm, are particularly favorable for digital radio link systems. The adaptive transverse equalizer of FIG. 2 is formed of a plurality of delay elements 1 through 5 iteratively connected. Each have a delay time T corresponding to the spacing between two successively sent characters. Control elements are provided which are connected to the inputs or outputs of the delay elements and which are connected to the inputs of a summer 13. The control elements having positive coefficients $c_1$, $c_2$, $c_3$ are referenced 9, 10, 11; and those having the negative coefficients $c_{-3}$, $c_{-2}$, and $c_{-1}$ are referenced 6, 7, 8. The control element 12 having the coefficient $c_0$ is inserted in the output path of the summer 13 and has its output side connected to an analog-to-digital converter 14 acting as a decision stage which is part of an overall decision means including elements 23-28, 16-22, 29-35, and 15 discussed hereafter. The analog-to-digital converter 14 comprises three outputs a, b, c for digital information and error bits. The manipulated variables (coefficients) for the control elements 6 through 12 are simultaneously derived from output signals of the analog-to-digital converter 14. For this purpose, the output c is connected to one input of each of seven exclusive-OR-gates 16 through 22, and are connected thereto via three delay elements 15. The second inputs of these exclusive-OR-gates are respectively connected to the output a of the analog-to-digital converter 14. Respective delay elements 23 through 28 are inserted between the exclusive-OR-gates 16 through 22. The correlation between error and operational sign bits is identified with the exclusive-OR-gates 16 through 22 and with the integrators 29 through 35. The outputs of the exclusive-OR-gates are connected to the inputs of the integrators which in turn supply the coefficients $c_0$, $c_1$, $c_2$, $c_3$, $c_{-1}$, $c_{-2}$, $c_{-3}$, i.e., large multiplication factors of the control elements 6 through 12.

A feedback path is provided from the two outputs a and b of the analog-to-digital converter 14 to the control element 11 having the coefficients $c_3$. This feedback path forms a linear transverse filter portion which contains a digital-to-analog converter 36, a low-pass filter 37, and a delay element 38 having the delay time 3T. A correction pulse which largely eliminates the residual ISI as set forth above with reference to the pulse diagrams, is generated via this decision-controlled, recursive path.

The circuit of the invention thus utilizes the advantages of linear transverse equalizers which lie both in the design region as well as in the realization region, and are formed of good acquisition behavior and of good convergence properties as well as a simple construction.

The carrier re-acquisition is required in the demodulator of a QAM system. This is advantageously arranged following the equalizer, in order to be able to also use its equalization performance. An engagement of the carrier re-acquisition phase control loop given linear distortions (multi-path propagation) as well, is supported by an equalizer which is in the position to converge, even given a disengaged carrier control loop.

Here, transverse filters are superior to pure decision feedback equalizers (error propagation, etc.) which exhibit favorable convergence properties only after engagement of the carrier loop. An equalizing is thus effected by the previously described linear transverse filter portion in accordance with the invention which enables the carrier control loop to engage, even given relatively strong multi-path distortions. The main contribution to the residual ISI lying one symbol period outside of an access region of the previously described linear transverse filter portion is eliminated (after engagement of the carrier control loop) by the decision-fedback correction pulse. This, however, is only possible in the case of minimum-phase distortion.

The advantage of the circuit arrangement of the invention as constructed is that the transit time of the decision-fedback paths is greater than a symbol period, and thus transit time problems are avoided.

Figure 3:
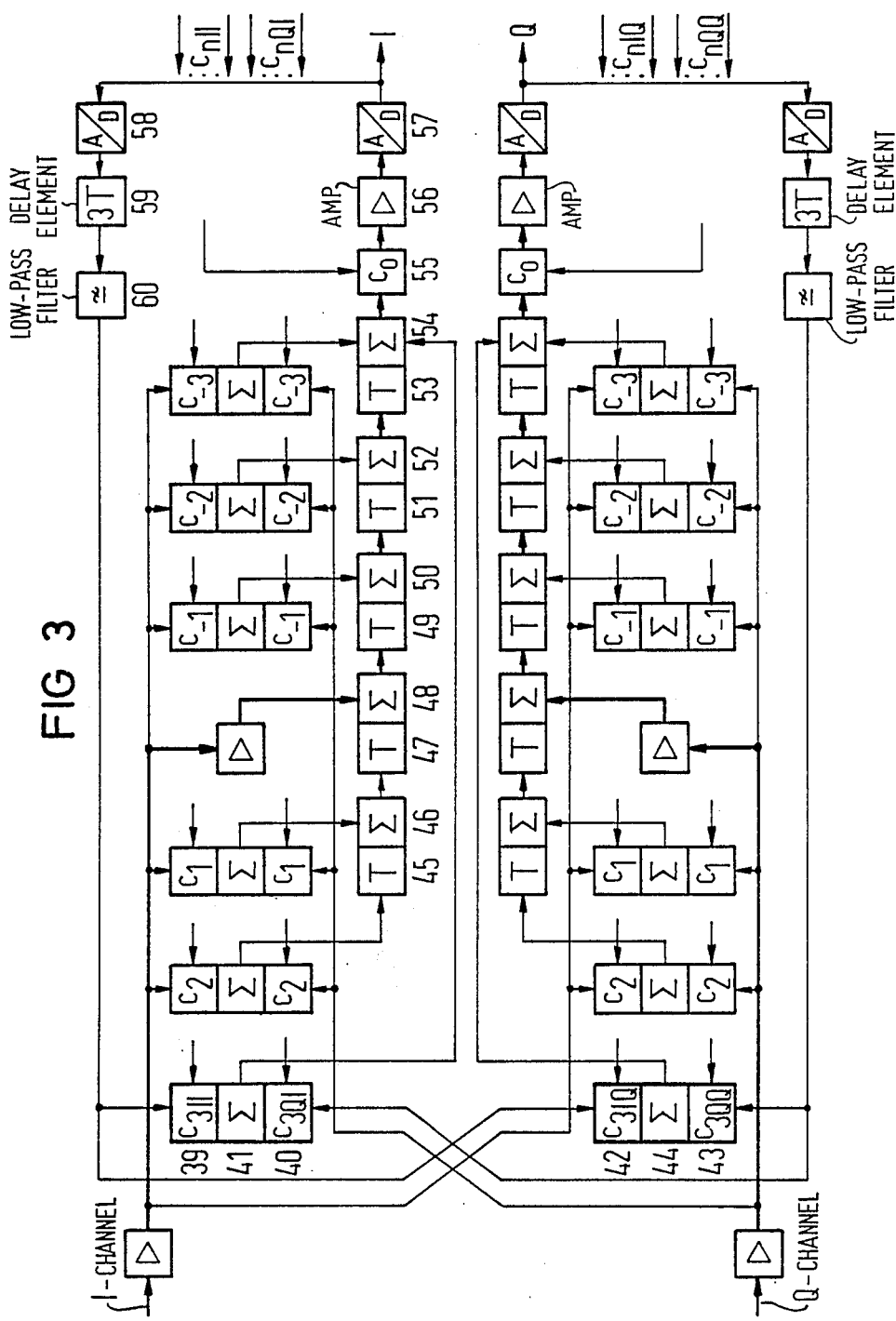
FIG. 3 is an adaptive, complex transverse equalizer having a parallel input and a serial output.

FIG. 3 shows an adaptive, complex transverse equalizer having six coefficients and a decision-fedback coefficient for the reduction of the residual ISI, which is realized in accordance with the parallel-in/serial-out structure. Such a complex arrangement provided for a QAM system, and having an I-channel and a Q-channel, contains identically fashioned equalizers in both channels. Since a compensation of cross-talk from one channel onto the other channel is to be simultaneously undertaken, two coefficients of the same order are provided in every channel, these being connected to one another via an adder element. For the sake of surveyability, that part of the circuit which relates to the generation of the controlled variables (coefficients) for the control elements has been omitted since it essentially corresponds to the corresponding circuit part in FIG. 2. Coefficients supplied to the control elements are merely indicated by arrows at the right in the Figure. The feedback path of the channel I and of the channel Q is respectively conducted to the control element having the coefficient $c_3$ in the equalizer of the same channel. Due to the compensation of the cross-talk, it is simultaneously conducted to the second control element of the same order in the equalizer of the other channel. In order to illustrate the different coefficients, the coefficient $c_3$ to which the feedback paths are conducted are provided with additional indices for all other coefficients, by way of example. In accordance therewith, the coefficient of the upper control element 39 in the I-channel is referenced $c_{3II}$, and is referenced $c_{3QI}$ in the lower control element 40. The coefficient of the upper control element 42 in the Q-channel has the reference symbol $c_{3IQ}$ and that of the lower control element 43 carries the reference $c_{3QQ}$.

The equalizers in the I-channel and Q-channel are identically fashioned so that it is adequate to describe the structure of one equalizer for an understanding of the circuit. In the I-channel, thus the control elements have their respectively corresponding summing element arranged parallel relative to one another at the input side, whereas the outputs are conducted to a series circuit of delay and summing elements 45 through 54. The summing element 41 corresponding to the two control elements 39, 40 having the coefficient $c_3$ (just like the summing element 44 for the control elements 42, 43 having the coefficient $c_3$) is connected to the last respective summing element 54 of the series connection which is followed by the control element 55 for the coefficient $c_0$. This is connected via an amplifier 56 to the analog-to-digital converter 57 from whose output a feedback path having a loop transit time 3T is conducted to the control element 39 with a coefficient $c_{3II}$ of the I-channel and to the control element 42 having the coefficient $c_{3IQ}$ of the Q-channel. It is conducted thereto via a digital-to-analog converter 58, a correspondingly dimensioned delay element 59, and a low-pass filter 60.

A major boost of the equalizer performance is established with the arrangements of the invention without noticeable circuit complexity.

Although various minor changes and modifications might be proposed by those skilled in the art, it will be understood that we wish to include within the claims of the patent warranted hereon all such changes and modifications as reasonably come within our contribution to the art.

We claim as our invention:

1. An adaptive transverse equalizer, comprising:
   a plurality of iteratively connected delay element means each having a delay time T in accordance with a spacing between two successively sent characters;
   a plurality of control element means each connected to respective inputs of a summer and having manipulated variables representing coefficients derived from output signals of a decision stage means;
   said decision stage means providing (n−1) positive and m negative coefficients set in accordance with a zero-forcing algorithm;
   linear transverse filter means forming a decision controlled recursion path for providing at least one additional, positive, decision-feedback coefficient as a correction pulse following upon an access region of said linear transverse filter means and whose loop transit time corresponds to n times or n+i times a symbol period, wherein m is a whole number≧0, i is a whole number≧1, and n is a whole number≧2; and wherein the equalizer is a complex transverse equalizer having identically designed equalizers in an I-channel and a Q-channel, feedback paths being provided from the decision stage means output of each channel to a corresponding control element of the same channel and of the other channel.

2. An adaptive transverse equalizer, comprising:

a plurality of iteratively connected delay element means each having a delay time T in accordance with a spacing between two successively sent characters;

a plurality of control element means each connected to respective inputs of a summer and having manipulated variables representing coefficients derived from output signals of a decision stage means;

said decision stage means providing (n−1) positive and m negative coefficients set in accordance with a zero-forcing algorithm;

linear transverse filter means forming a decision controlled recursion path for providing at least one additional, positive, decision-fedback coefficient as a correction pulse following upon an access region of said linear transverse filter means and whose loop transit time corresponds to n times or n+i times a symbol period, wherein m is a whole number≧0, i is a whole number≧1, and n is a whole number≧2; and wherein said transverse filter means comprises an analog-to-digital converter connecting to a low pass filter which in turn connects to a delay element.

3. An adaptive transverse equalizer, comprising:

a plurality of iteratively connected delay element means each having a delay time T in accordance with a spacing between two successively sent characters;

a plurality of control element means each connected to respective inputs of a summer and having manipulated variables representing coefficients derived from output signals of a decision stage means;

said decision stage means providing (n−1) positive and m negative coefficients set in accordance with a zero-forcing algorithm;

linear transverse filter means forming a decision controlled recursion path for providing at least one additional, positive, decision-fedback coefficient as a correction pulse following upon an access region of said linear transverse filter means and whose loop transit time corresponds to n times or n+i times a symbol period, wherein m is a whole number≧0, i is a whole number≧1, and n is a whole number≧2;

said decision stage means comprising a decision stage formed of an analog-to-digital converter having first, second, and third outputs;

the decision stage first output connecting to a plurality of series connected delay elements having a delay T, said delay elements connecting to first inputs of a plurality of logic gates, second inputs of the plurality of logic gates connecting to the decision stage third output via a delay means having a delay time greater than T;

outputs of the logic elements connecting to respective integrators for each of the coefficients, said integrators outputting to said respective control elements; and said transverse filter means comprising an analog-to-digital converter having first and second inputs respectively connecting to the first and second inputs of the decision stage, and an output of the analog-to-digital converter connecting through a low-pass filter to a delay element having a delay greater than T, the delay element outputting to an additional control element means at which the at least one additional positive decision fedback coefficient is provided.

4. An adaptive equalizer, comprising:

an input signal applied in parallel to a plurality of control element means, output signals at outputs of the respective control element means being connected into a transit time chain having a plurality of elements each having a time T associated therewith, the respective control element means connecting to the respective elements of the transit time chain;

the control element means each having manipulated variables respectively associated therewith representing coefficients which are derived from output signals of a decision stage means connected to the respective control element means;

said decision stage means providing (n−1) positive and m negative coefficients set in accordance with a zero-forcing algorithm; and means forming a decision controlled recursion path for providing at least one additional positive, decision-fedback coefficient as a correction pulse following upon an access region of said linear transverse filter means and whose loop transit time corresponds to n times or (n+1) times a symbol period, wherein m is a whole number≧0, i is a whole number≧1, and n is a whole number≧2.

5. A transverse equalizer according to claim 4 wherein the equalizer is a complex transverse equalizer having identically designed equalizers in an I-channel and a Q-channel, feedback paths being provided from the decision stage means output of each channel to a corresponding control element of the same channel and of the other channel.

6. A transverse equalizer according to claim 4 wherein said transverse filter means comprises an analog-to-digital converter connecting to a low pass filter which in turn connects to a delay element.

7. A transverse equalizer according to claim 4 wherein said decision stage means comprises a decision stage formed of an analog-to-digital converter having first, second, and third outputs; the decision stage first output connecting to a plurality of series connected delay elements having a delay T, said delay elements connecting to first inputs of a plurality of logic gates, second inputs of the plurality of logic gates connecting to the decision stage third output via a delay means having a delay time greater than T; outputs of the logic elements connecting to respective integrators for each of the coefficients, said integrators outputting to said respective control elements; and said transverse filter means comprising an analog-to-digital converter having first and second inputs respectively connecting to the first and second inputs of the decision stage, and an output of the analog-to-digital converter connecting through a low-pass filter to a delay element having a delay greater than T, the delay element outputting to an additional control element means at which the at least one additional positive decision fedback coefficient is provided.

* * * * *